United States Patent
Bradburn

(10) Patent No.: US 6,879,721 B2
(45) Date of Patent: Apr. 12, 2005

(54) PIXEL PROCESSING SYSTEM FOR IMAGE PRODUCTION

(75) Inventor: Brent M. Bradburn, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 654 days.

(21) Appl. No.: 09/753,170

(22) Filed: Jan. 2, 2001

(65) Prior Publication Data

US 2002/0085237 A1 Jul. 4, 2002

(51) Int. Cl.$^7$ .................................................. G06T 5/20
(52) U.S. Cl. ........................ 382/205; 382/270; 382/274
(58) Field of Search ................................. 382/270–274, 382/260–262, 205, 167

(56) References Cited

U.S. PATENT DOCUMENTS

| | | | |
|---|---|---|---|
| 4,468,704 A | 8/1984 | Stoffel et al. | |
| 4,742,552 A | 5/1988 | Andrews | |
| 4,799,105 A | 1/1989 | Mitchell et al. | |
| 5,386,483 A | 1/1995 | Shibazaki | |
| 5,506,699 A | * 4/1996 | Wong | 358/3.08 |
| 5,661,570 A | 8/1997 | Nomura | |
| 5,699,079 A | 12/1997 | Gossett | |
| 5,768,482 A | 6/1998 | Winter et al. | |
| 5,835,687 A | 11/1998 | Brown et al. | |
| 5,847,714 A | 12/1998 | Naqvi et al. | |
| 5,930,407 A | 7/1999 | Jensen | |
| 5,931,960 A | * 8/1999 | Kletter et al. | 714/704 |
| 6,453,068 B1 | * 9/2002 | Li | 382/167 |
| 6,483,941 B1 | * 11/2002 | Li | 382/167 |
| 6,608,700 B1 | * 8/2003 | Mantell | 358/1.9 |

\* cited by examiner

*Primary Examiner*—Jon Chang
*Assistant Examiner*—Wes Tucker

(57) ABSTRACT

A pixel processing system receives a target pixel value and neighbor pixel values. The neighbor pixel values may correspond to eight neighbor pixels that surround a target pixel corresponding to the target pixel value. The pixel processing system determines a minimum value and a maximum value among the neighbor pixel values. If the target pixel value is less than the minimum value, then the pixel processing system increases the target pixel value. If the target pixel value is greater than the maximum value, then the pixel processing system reduces the target pixel value. In response to increasing the target pixel value, the pixel processing system may reduce the neighbor pixel values to maintain an average value. In response to reducing the target pixel value, the pixel processing system may increase the neighbor pixel values to maintain an average value.

30 Claims, 5 Drawing Sheets

PIXEL PROCESSING SYSTEM FOR IMAGE PRODUCTION

BACKGROUND OF THE INVENTION

1. Field of the Invention

The invention is related to the field of image production, and in particular, to a pixel processing system that adjusts target pixel values based on minimum and maximum neighbor pixel values.

2. Statement of the Problem

Image production systems include copiers, printers, and graphic displays. Image production systems process pixels to generate an image. Each pixel controls the shading of a small area on the image. The image processing system uses a pixel processing system to improve image quality. Typically, the pixel processing system reduces variations among neighboring pixels to provide better continuity within a localized area on the image. Some common pixel processing systems are median filters and convolution filters.

Median filters adjust pixels based on median pixel values. Unfortunately, median filters are process-intensive. Not only are they complex and cumbersome to operate, median filters often have too much effect on the image. Convolution filters use mathematical convolution to smooth the image. Unfortunately, convolution filters reduce the quality of edge features—the lines in the image. Convolution filters tend to blur the image and lose its sharpness.

SUMMARY OF THE SOLUTION

The invention helps solve the above problems with a pixel processing system that may be less complex than median filters and provide better edge quality than convolution filters. The pixel processing system reduces variation among neighboring pixels to improve image quality. The pixel processing system is suitable for operation in a printer or copier.

Some examples of the invention include a pixel processing system that receives a target pixel value and neighbor pixel values. The neighbor pixel values may correspond to eight neighbor pixels that surround a target pixel corresponding to the target pixel value. The pixel processing system determines a minimum value and a maximum value among the neighbor pixel values. If the target pixel value is less than the minimum value, then the pixel processing system increases the target pixel value. If the target pixel value is greater than the maximum value, then the pixel processing system reduces the target pixel value. The pixel processing system may increase the target pixel value to the minimum value or reduce the target pixel value to the maximum value. Alternatively, the pixel processing system may increase the target pixel value half-way toward the minimum value or reduce the target pixel value halfway toward the maximum value. In response to increasing the target pixel value, the pixel processing system may reduce the neighbor pixel values by a corresponding amount to maintain an average value. In response to reducing the target pixel value, the pixel processing system may increase the neighbor pixel values by a corresponding amount to maintain an average value. The pixel processing system may reduce or increase the neighbor pixel values corresponding to only the two neighbor pixels horizontally aligned with the target pixel.

In some examples of the invention, the pixel processing system is comprised of pixel evaluation circuitry and pixel adjustment circuitry. The pixel evaluation circuitry receives the pixel values and determines the minimum value and the maximum value. The pixel adjustment circuitry increases and reduces the pixel values as described above. In some examples of the invention, the pixel processing system is comprised of storage media that stores pixel processing control instructions. The pixel processing control instructions direct a processor to operate the pixel processing system as described above.

DESCRIPTION OF THE DRAWINGS

The same reference number represents the same element on all drawings.

DETAILED DESCRIPTION OF THE INVENTION

Figure 1:
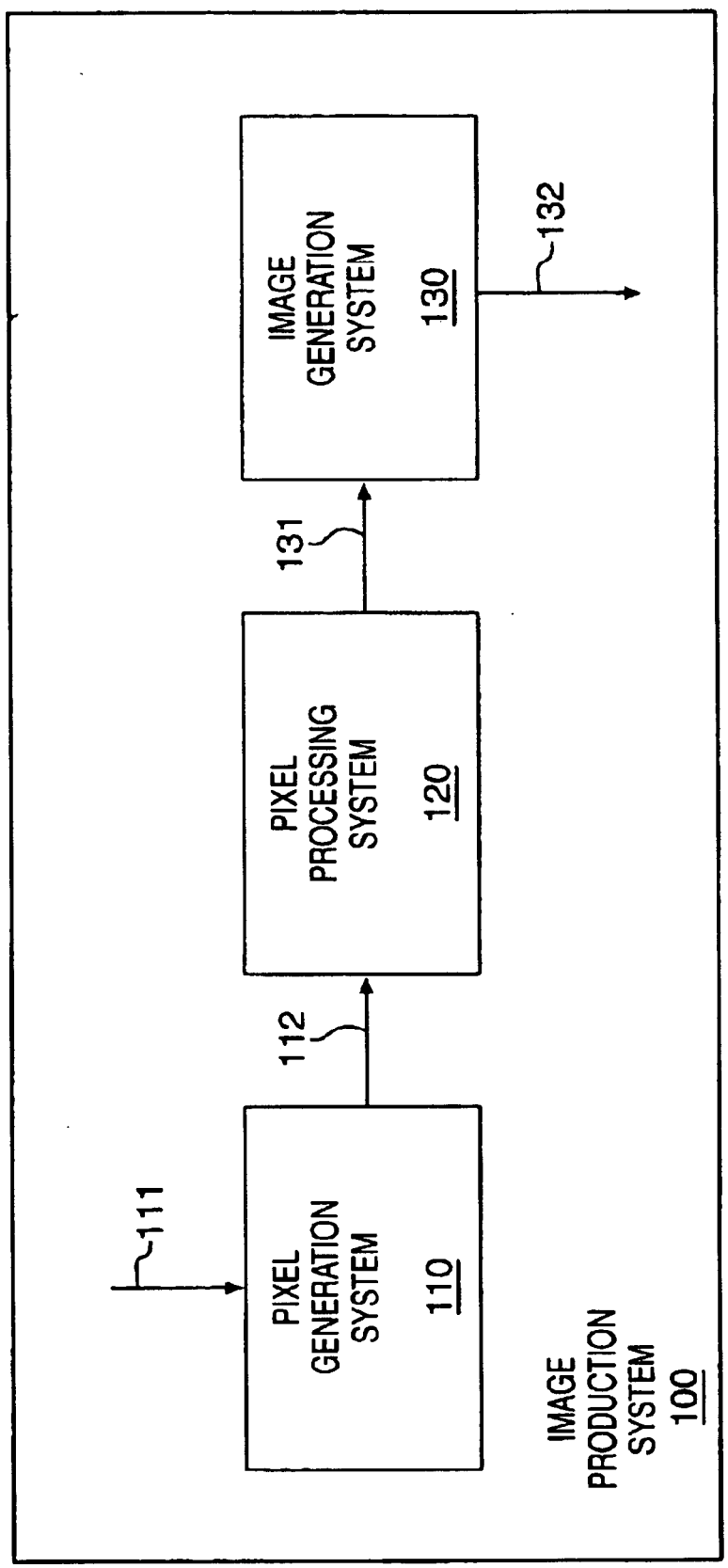
FIG. 1 is a block diagram that illustrates an image production system in an example of the invention.

FIG. 1 is a block diagram that illustrates image production system 100 in an example of the invention. Image production system 100 comprises pixel generation system 110, pixel processing system 120, and image generation system 130. Image production system 100 produces an image 132 based on image representation 111. Image production system 100 could be a printer, copier, graphical display, or some other type of image generation device.

Pixel generation system 110 receives and processes image representation 111 to generate pixel values 112. Pixel values 112 specify the shading for small areas of image 132. Pixel values 112 may be eight-bit codes that define clusters of dots that provide the shading. If representation 111 is physical material, pixel generation system 110 may scan the material to generate pixel values 112. If representation 111 is an electromagnetic signal, pixel generation system 110 may electronically process the signal to generate pixel values 112. Pixel values 112 may even be received from an external source eliminating the need for pixel generation system 110.

In some examples of the invention, image production system 100 produces a monochrome image 132 where pixel values 112 only control the shading of a single color scheme, such as white-gray-black. In other examples of the invention, image production system 100 produces a color image 132 where pixel values 112 control the shading of a multiple color schemes. The remaining description assumes monochrome operation, but those skilled in the art will appreciate how the description could be readily applied to color operation.

Pixel processing system 120 receives and processes pixel values 112 as described below to generate adjusted pixel values 131. Image generation system 130 receives adjusted pixel values 131 and produces image 132 based on adjusted pixel values 131. Ideally, image 132 is a high-quality depiction of representation 111.

Figure 2:
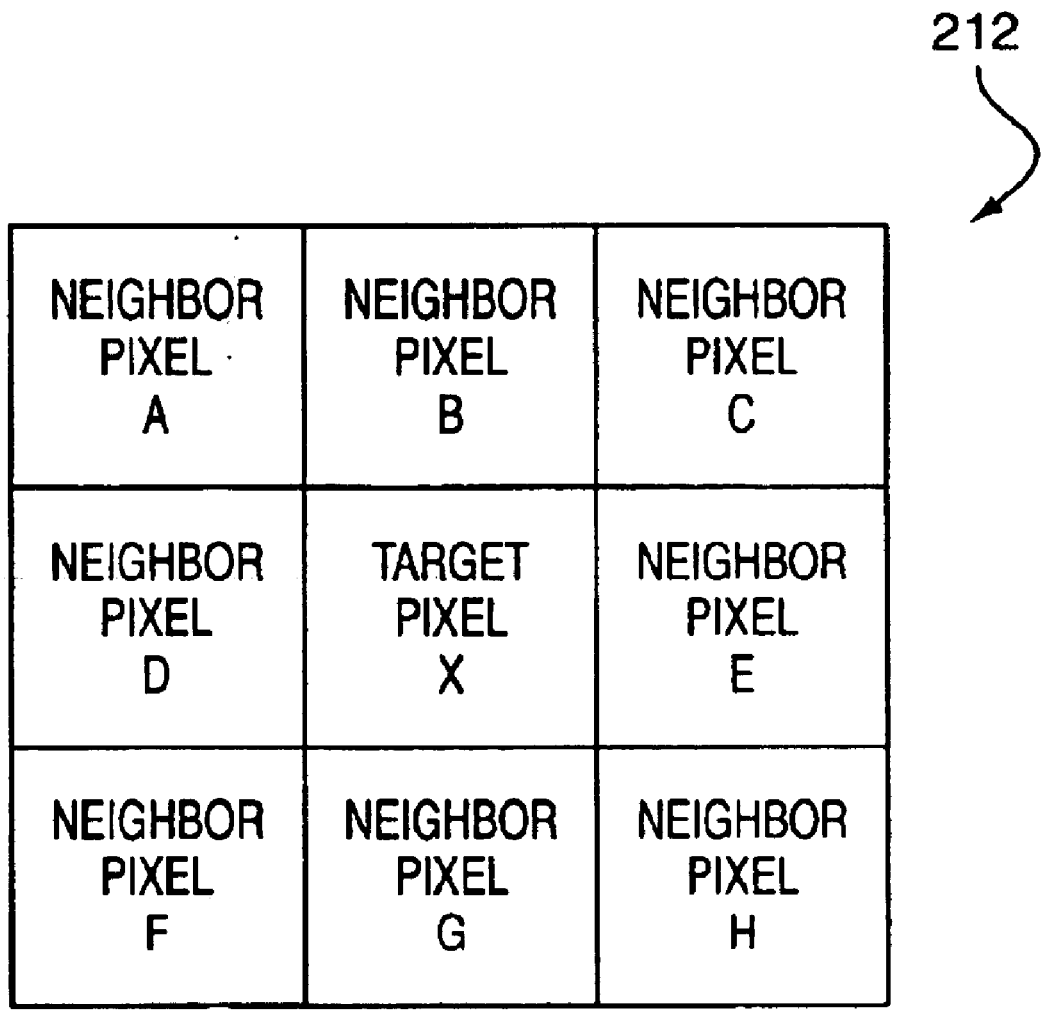
FIG. 2 is a block diagram that illustrates pixels in an example of the invention.

FIG. 2 is a block diagram that illustrates pixels 212 in an example of the invention. Pixel values 112 correspond to pixels 212. Pixels 212 include a target pixel X and neighbor pixels A–H. Neighbor pixels A–H surround target pixel X to form a three-by-three grid with target pixel X in the center. Note that neighbor pixels D and E are the only two neighbor pixels that are horizontally aligned with target pixel X.

Figure 3:
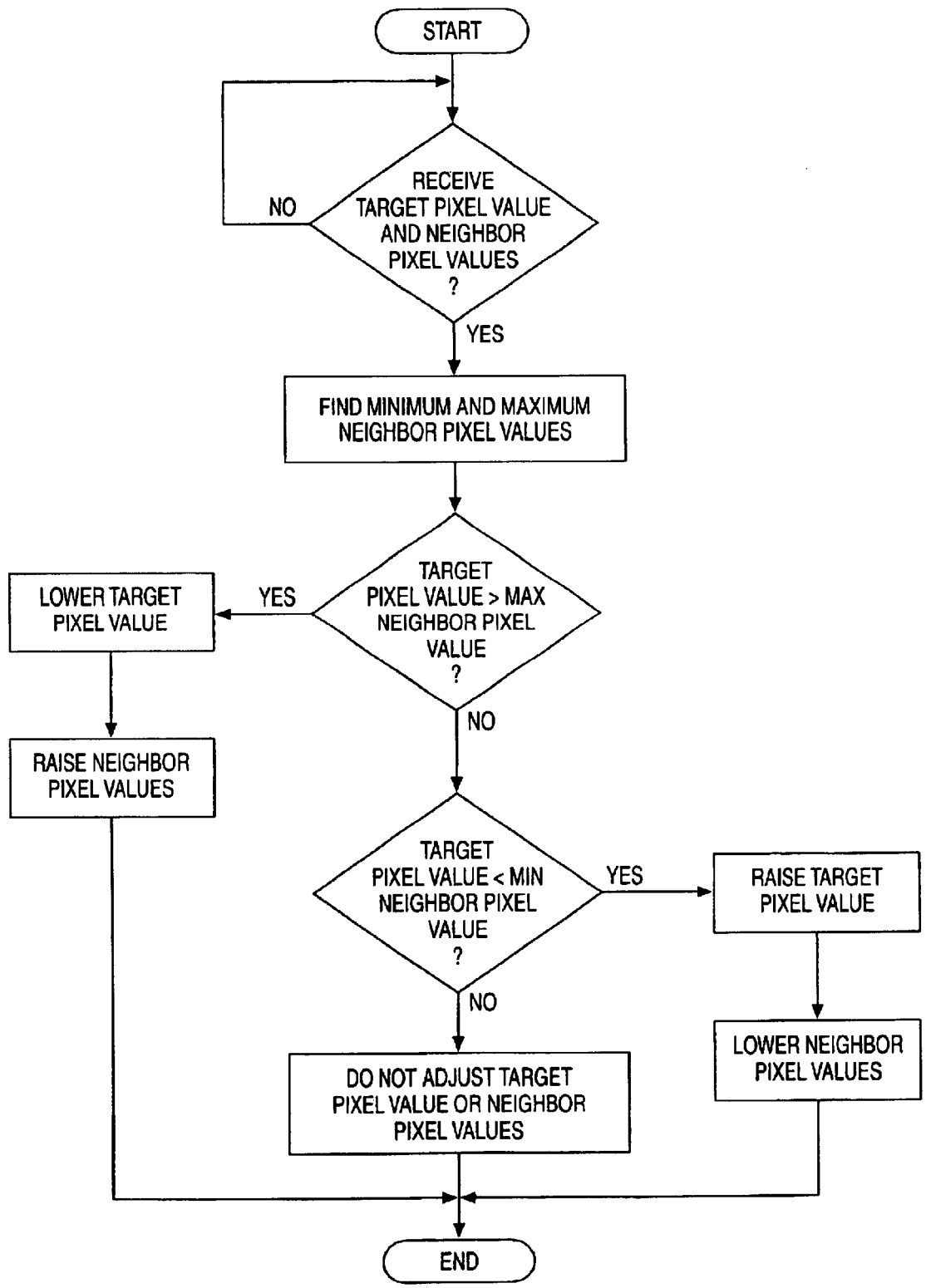
FIG. 3 is a flow diagram that illustrates pixel processing system operation in an example of the invention.

FIG. 3 is a flow diagram that illustrates pixel processing system 120 operation in an example of the invention. Pixel processing system 120 receives pixel values 112 that comprise a target pixel value X corresponding to target pixel X and neighbor pixel values A–H corresponding to neighbor pixels A–H. Pixel processing system 120 determines a minimum value and a maximum value among the neighbor pixel values A–H. Thus, the lowest and highest pixel values in the surrounding neighborhood are found.

If the target pixel value X is less than the minimum value, then pixel processing system 120 increases the target pixel value X. Pixel processing system 120 may increase target pixel value X to the minimum value. Alternatively, pixel processing system 120 may increase the target pixel value X half-way toward the minimum value based on the equation:

$$X'=X+(MIN-X)/2; \text{ where}$$

X'=the adjusted target pixel value X;
X=the received target pixel value X; and
MIN=the minimum value among neighbor pixels A–H.

In response to increasing the target pixel value X, pixel processing system 120 reduces neighbor pixel values A–H by a corresponding total amount to maintain an average value. Thus, the total value for target pixel X and neighbor pixels A–H remains effectively the same. In some cases, pixel processing system 120 only reduces pixel values D and E that are horizontally aligned with target pixel X, and leaves the other neighbor pixels values A–C and F–H the same. If the half-way increase for target pixel X was used, then pixel processing system 120 may reduce the horizontal neighbor pixels D and E based on the equations:

$$D'=D-(MIN-X)/4; \text{ and}$$

$$E'=E-(MIN-X)/4; \text{ where}$$

D'=the adjusted neighbor pixel value D;
D=the received neighbor pixel value D;
E'=the adjusted neighbor pixel value E; and
E=the received neighbor pixel value E.

If the target pixel value X is greater than the maximum value, then pixel processing system 120 reduced the target pixel value X. Pixel processing system 120 may reduce target pixel value X to the maximum value. Alternatively, pixel processing system 120 may reduce the target pixel value X half-way toward the maximum value based on the equation:

$$X'=X-(X-MAX)/2; \text{ where}$$

X'=the adjusted target pixel value X;
X=the received target pixel value X; and
MAX=the maximum value among neighbor pixels A–H.

In response to reducing the target pixel value X, pixel processing system 120 increases neighbor pixel values A–H by a corresponding total amount to maintain an average value. In some cases, pixel processing system 120 only increases pixel values D and E that are horizontally aligned with target pixel X, and leaves the other neighbor pixels values A–C and F–H the same. If the half-way reduction for target pixel X was used, then pixel processing system 120 may increase the horizontal neighbor pixels D and E based on the equations:

$$D'=D+(X-MAX)/4; \text{ and}$$

$$E'=E+(X-MAX)/4.$$

If the target pixel value X is not less than the minimum value or greater than the maximum value, then pixel processing system 120 does not adjust the target pixel value X or the neighbor pixel values A–H. Those skilled in the art appreciate that in the context of the invention, the terms "greater than" or "less than" are substantially the same as "greater than or equal to" or "less than or equal to". In addition, the amount of the adjustment to pixel values 112 may be best determined through empirical measurement in the field.

Figure 4:
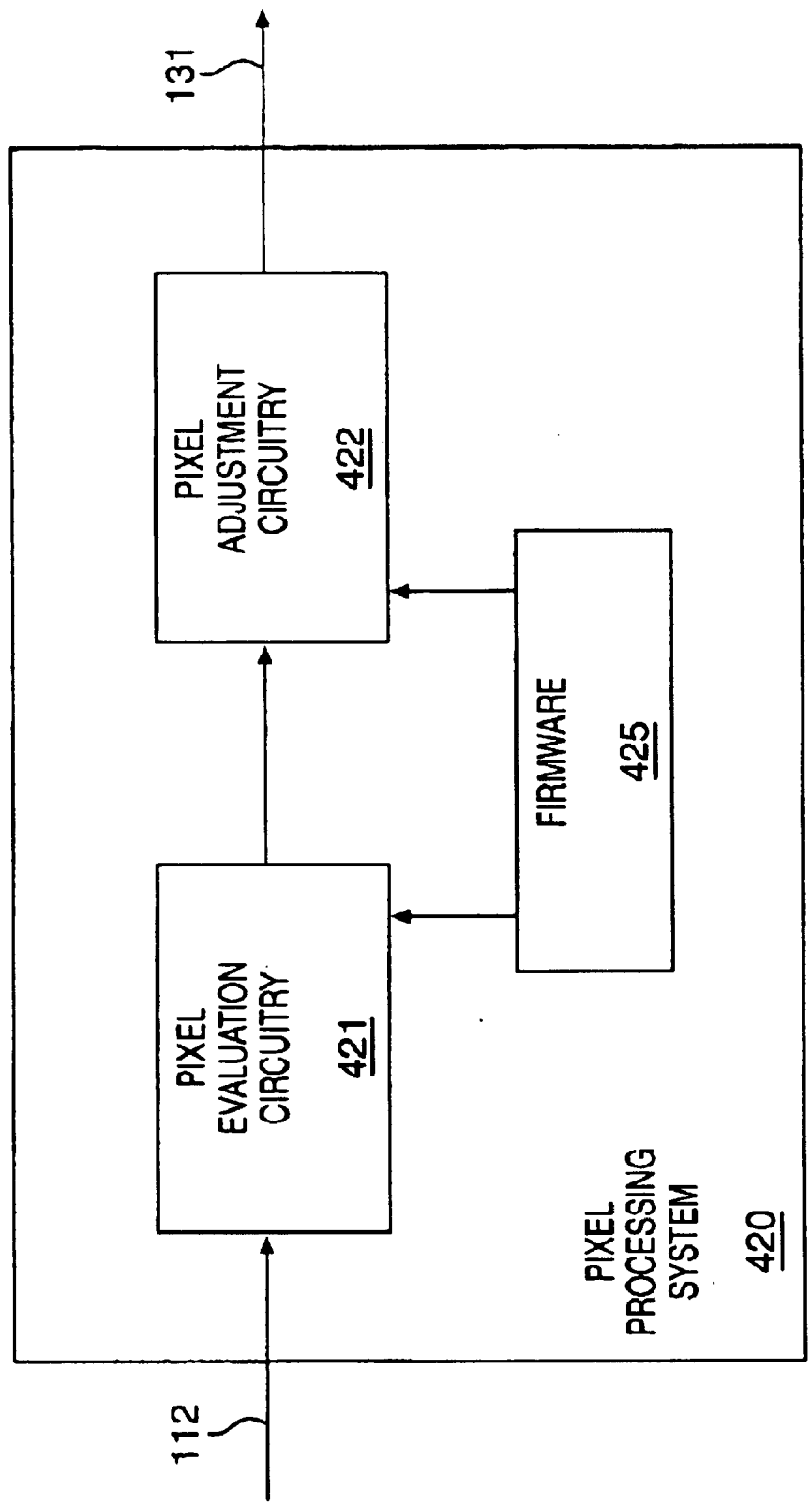
FIG. 4 is a block diagram that illustrates a pixel processing system in an example of the invention.

FIG. 4 is a block diagram that illustrates pixel processing system 420 in an example of the invention. Pixel processing system 420 is comprised of pixel evaluation circuitry 421, pixel adjustment circuitry 422, and firmware 425. Pixel evaluation circuitry 421 receives pixel values 112 and determines the minimum value, maximum value, and average value as described above. Pixel evaluation circuitry 421 transfers pixel values 112, the minimum value, the maximum value, and the average value to pixel adjustment circuitry 422. Pixel adjustment circuitry 422 increases and reduces pixel values 112 as described above to produce adjusted pixel values 131.

Firmware 425 is optional to control pixel evaluation circuitry 421 and pixel adjustment circuitry 422—although pixel evaluation circuitry 421 and pixel adjustment circuitry 422 may be all hardware if desired. Firmware 425 could allow some programmability, such as setting the amount of pixel value adjustment based on field measurement.

Figure 5:
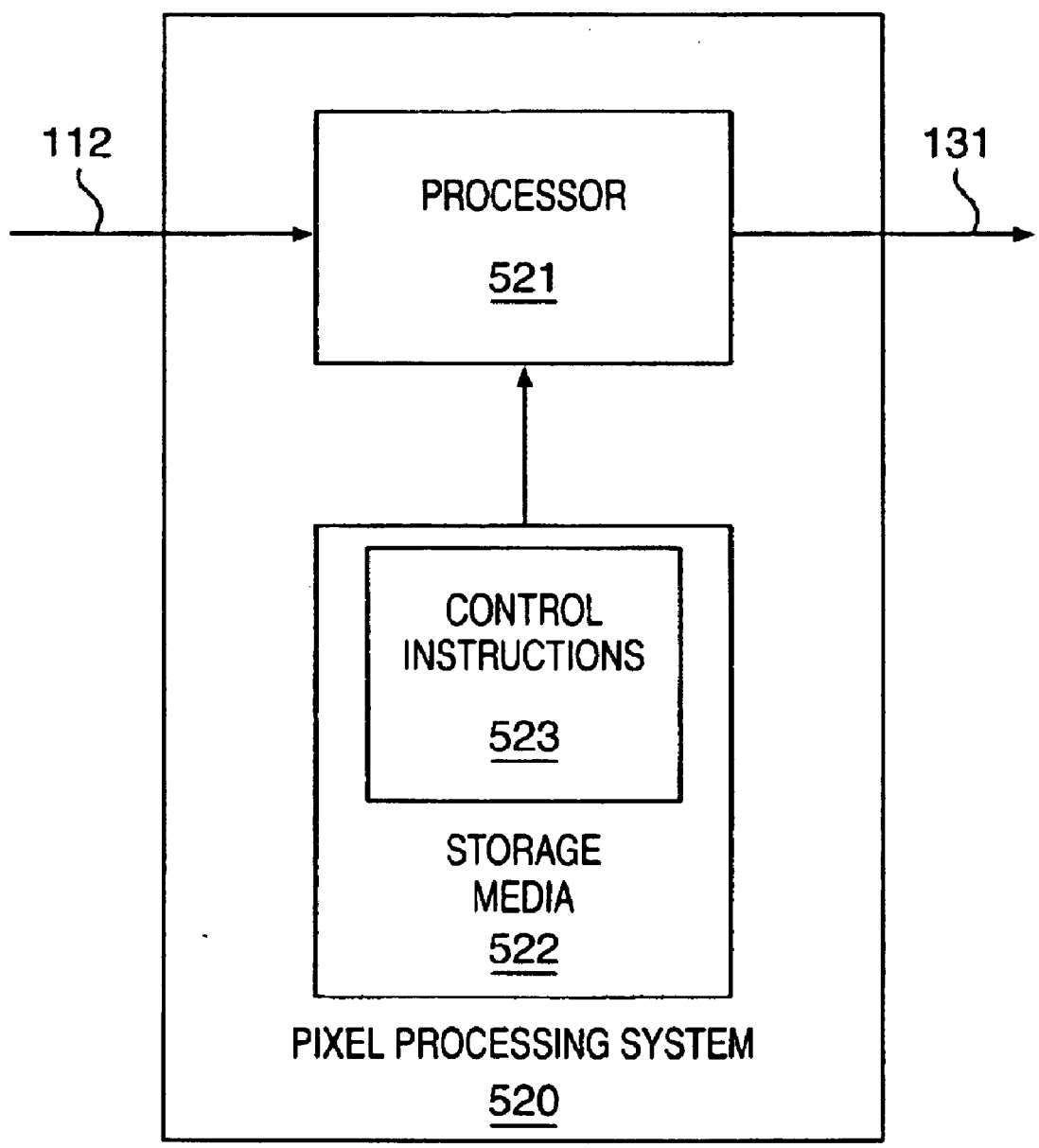
FIG. 5 is a block diagram that illustrates a pixel processing system in an example of the invention.

FIG. 5 is a block diagram that illustrates pixel processing system 520 in an example of the invention. Pixel processing system 520 is comprised of processor 521 and storage media 522. Storage media 522 stores control instructions 523. Some examples of instructions are software and firmware. Some examples of storage media are memory devices, tape, disks, integrated circuits, and servers. Processor 521 could be a single processing device or a group of inter-operational processing devices. Some examples of processors are computers, integrated circuits, and logic circuitry. Those skilled in the art are familiar with instructions, processors, and storage media.

Processor 521 retrieves and executes control instructions 523 from storage media 522. When executed by processor 521, control instructions 523 direct processor 521 to operate pixel processing system 520 as described above with respect to FIG. 3. Processor 521 receives and processes pixel values 112 to produce adjusted pixel values 131.

FIGS. 1–5 and the above description depict a specific example of a pixel processing system in accord with the present invention. Those skilled in the art will appreciate that some conventional aspects of the pixel processing system have been simplified or omitted for clarity. Those skilled in the art will appreciate that the features described above could be combined in various ways to form multiple variations of the invention. Those skilled in the art will also appreciate variations of the pixel processing system that fall within the scope of the invention. As a result, the invention is not limited to the specific example described above, but only by the following claims and their equivalents.

What is claimed is:

1. A method of operating a pixel processing system, the method comprising:
  receiving a target pixel value and neighbor pixel values;
  determining a minimum value and a maximum value among the neighbor pixel values;

if the target pixel value is less than the minimum value, then increasing the target pixel value and, in response to increasing the target pixel value, reducing at least one of the neighbor pixel values; and if the target pixel value is greater than the maximum value, then reducing the target pixel value and, in response to reducing the target pixel value, increasing at least one of the neighbor pixel values.

2. A method of operating a pixel processing system, the method comprising:

receiving a target pixel value and neighbor pixel values;

determining a minimum value and a maximum value among the neighbor pixel values;

if the target pixel value is less than the minimum value, then increasing the target pixel value and, in response to increasing the target pixel value, reducing the neighbor pixel values to maintain an average value; and if the target pixel value is greater than the maximum value, then reducing the target pixel value and, in response to reducing the target pixel value, increasing the neighbor pixel values to maintain the average value.

3. The method of claim 2 wherein the neighbor pixel values correspond to eight neighbor pixels that surround a target pixel corresponding to the target pixel value.

4. The method of claim 2 wherein:

increasing the target pixel value comprises increasing the target pixel value to the minimum value; and reducing the target pixel value comprises reducing the target pixel value to the maximum value.

5. The method of claim 2 wherein:

increasing the target pixel value comprises increasing the target pixel value half-way toward the minimum value; and reducing the target pixel value comprises reducing the target pixel value half-way toward the maximum value.

6. The method of claim 2 wherein:

reducing the neighbor pixel values comprises reducing the neighbor pixel values corresponding to only two neighbor pixels horizontally aligned with a target pixel corresponding to the target pixel value; and increasing the neighbor pixel values comprises increasing the neighbor pixel values corresponding to only the two neighbor pixels horizontally aligned with the target pixel.

7. The method of claim 2 wherein the pixel processing system comprises one of a printer and a copier.

8. A pixel processing system comprising:

pixel evaluation circuitry configured to receive a target pixel value and neighbor pixel values and determine a minimum value and a maximum value among the neighbor pixel values; and pixel adjustment circuitry configured to increase the target pixel value if the target pixel value is less than the minimum value and reduce the target pixel value if the target pixel value is greater than the maximum value, wherein the pixel adjustment circuitry is configured to reduce at least one of the neighbor pixel values in response to increasing the target pixel value and increase at least one of the neighbor pixel values in response to reducing the target pixel value.

9. A pixel processing system comprising:

pixel evaluation circuitry configured to receive a target pixel value and neighbor pixel values and determine a minimum value and a maximum value among the neighbor pixel values; and pixel adjustment circuitry configured to increase the target pixel value if the target pixel value is less than the minimum value and reduce the target pixel value if the target pixel value is greater than the maximum value, wherein the pixel adjustment circuitry is configured to reduce the neighbor pixel values to maintain an average value in response to increasing the target pixel value and increase the neighbor pixel values to maintain the average value in response to reducing the target pixel value.

10. The pixel processing system of claim 9 wherein the neighbor pixel values correspond to eight neighbor pixels that surround a target pixel corresponding to the target pixel value.

11. The pixel processing system of claim 9 wherein the pixel adjustment circuitry is configured to increase the target pixel value to the minimum value and reduce the target pixel value to the maximum value.

12. The pixel processing system of claim 9 wherein the pixel adjustment circuitry is configured to increase the target pixel value half-way toward the minimum value and reduce the target pixel value halfway toward the maximum value.

13. The pixel processing system of claim 9 wherein the pixel adjustment circuitry is configured to reduce the neighbor pixel values corresponding to only two neighbor pixels horizontally aligned with a target pixel corresponding to the target pixel value and increase the neighbor pixel value; corresponding to only the two neighbor pixels horizontally aligned with the target pixel.

14. The pixel processing system of claim 9 wherein the pixel processing system comprises one of a printer and a copier.

15. A product for pixel processing comprising:

pixel processing control instructions configured to direct a processor to receive a target pixel value and neighbor pixel values, determine a minimum value and a maximum value among the neighbor pixel values, increase the target pixel value if the target pixel value is less than the minimum value, and reduce the target pixel value if the target pixel value is greater than the maximum value; and storage media that is processor-readable and that stores the pixel processing control instructions, wherein the pixel processing control instructions are configured to direct the processor to reduce at least one of the neighbor pixel values in response to increasing the target pixel value, and increase at least one of the neighbor pixel values in response to reducing the target pixel value.

16. A product for pixel processing comprising:

pixel processing control instructions configured to direct a processor to receive a target pixel value and neighbor pixel values, determine a minimum value and a maximum value among the neighbor pixel values, increase the target pixel value if the target pixel value is less than the minimum value, and reduce the target pixel value if the target pixel value is greater than the maximum value; and storage media that is processor-readable and that stores the pixel processing control instructions;

wherein the pixel processing control instructions are configured to direct the processor to reduce the neighbor pixel values to maintain an average value in response to increasing the target pixel value, and increase the neighbor pixel values to maintain the average value in response to reducing the target pixel value.

17. The product of claim 16 wherein the neighbor pixel values correspond to eight neighbor pixels that surround a target pixel corresponding to the target pixel value.

18. The product of claim 16 wherein the pixel processing control instructions are configured to direct the processor to increase the target pixel value to the minimum value and reduce the target pixel value to the maximum value.

19. The product of claim 16 wherein the pixel processing control instructions are configured to direct the processor to increase the target pixel value half-way toward the minimum value and reduce the target pixel value halfway toward the maximum value.

20. The product of claim 16 wherein the pixel processing control instructions are configured to direct the processor to reduce the neighbor pixel values corresponding to only two neighbor pixels horizontally aligned with a target pixel corresponding to the target pixel value and increase the neighbor pixel values corresponding to only the two neighbor pixels horizontally aligned with the target pixel.

21. The method of claim 1 wherein:
increasing the target pixel value comprises increasing the target pixel value to at least the minimum value; and
reducing the target pixel value comprises reducing the target pixel value to at least the maximum value.

22. The method of claim 1 wherein:
increasing the target pixel value comprises increasing the target pixel value at least half-way toward the minimum value; and
reducing the target pixel value comprises reducing the target pixel value at least halfway toward the maximum value.

23. The method of claim 1 wherein:
reducing at least one of the neighbor pixel values comprises reducing the neighbor pixel values corresponding to two neighbor pixels horizontally aligned with a target pixel corresponding to the target pixel value; and
increasing at least one of the neighbor pixel values comprises increasing the neighbor pixel values corresponding to the two neighbor pixels horizontally aligned with the target pixel.

24. The pixel processing system of claim 8 wherein the pixel adjustment circuitry is configured to increase the target pixel value to at least the minimum value and reduce the target pixel value to at least the maximum value.

25. The pixel processing system of claim 8 wherein the pixel adjustment circuitry is configured to increase the target pixel value at least half-way toward the minimum value and reduce the target pixel value at least halfway toward the maximum value.

26. The pixel processing system of claim 8 wherein the pixel adjustment circuitry in configured to reduce the neighbor pixel values corresponding to two neighbor pixels horizontally aligned with a target pixel corresponding to the target pixel value and increase the neighbor pixel values corresponding to the two neighbor pixels horizontally aligned with the target pixel.

27. The product of claim 15 wherein the pixel processing control instructions are configured to direct the processor to increase the target pixel value to at least the minimum value and reduce the target pixel value to at least the maximum value.

28. The product of claim 15 wherein the pixel processing control instructions are configured to direct the processor to increase the target pixel value at least half-way toward the minimum value and reduce the target pixel value at least halfway toward the maximum value.

29. The product of claim 15 wherein the pixel processing control instructions are configured to direct the processor to reduce the neighbor pixel values corresponding to two neighbor pixels horizontally aligned with a target pixel corresponding to the target pixel value and increase the neighbor pixel values corresponding to the two neighbor pixels horizontally aligned with the target pixel.

30. A pixel processing system comprising:
means for receiving a target pixel value and neighbor pixel values and determining a minimum value and a maximum value among the neighbor pixel values;
means for increasing the target pixel value if the target pixel value is less than the minimum value and reducing at least one or the neighbor pixel values in response to increasing the target pixel value; and
means for reducing the target pixel value if the target pixel value is greater than the maximum value and increasing at least one of the neighbor pixel values in response to reducing the target pixel value.

* * * * *